(12) United States Patent
Schmidt et al.

(10) Patent No.: US 8,855,854 B2
(45) Date of Patent: Oct. 7, 2014

(54) METHOD FOR MONITORING THE HITCH OF A TRAILER HITCHABLE TO A TOW VEHICLE AND CORRESPONDING ELECTRONIC DEVICE UNIT

(71) Applicants: Oliver Schmidt, Greisenfeld (DE); Armin Huemmer, Ludwigsburg (DE)

(72) Inventors: Oliver Schmidt, Greisenfeld (DE); Armin Huemmer, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/781,299

(22) Filed: Feb. 28, 2013

(65) Prior Publication Data

US 2014/0032040 A1 Jan. 30, 2014

Related U.S. Application Data

(63) Continuation of application No. 13/520,553, filed as application No. PCT/EP2010/068695 on Dec. 2, 2010, now abandoned.

(30) Foreign Application Priority Data

Jan. 12, 2010 (DE) .......................... 10 2010 000 825

(51) Int. Cl.
*G06F 17/00* (2006.01)
*B60T 7/20* (2006.01)
*B60T 8/17* (2006.01)
*B60T 8/172* (2006.01)

(52) U.S. Cl.
CPC . *G06F 17/00* (2013.01); *B60T 7/20* (2013.01); *B60T 8/1708* (2013.01); *B60T 8/172* (2013.01); *B60T 2230/06* (2013.01)
USPC ........................................................ 701/33.9

(58) Field of Classification Search
USPC ........................................................ 701/33.9
See application file for complete search history.

(56) References Cited

U.S. PATENT DOCUMENTS 5,380,072 A * 1/1995 Breen .............................. 303/7
6,668,225 B2 * 12/2003 Oh et al. ......................... 701/70

(Continued)

FOREIGN PATENT DOCUMENTS

CN 1315912 10/2001
CN 101547817 9/2009

(Continued)

OTHER PUBLICATIONS

International Search Report for PCT/EP2010/068695, dated Mar. 1, 2011.

*Primary Examiner* — Thomas Tarcza
*Assistant Examiner* — Alex C Dunn
(74) *Attorney, Agent, or Firm* — Kenyon & Kenyon LLP

(57) ABSTRACT

In a method for monitoring the hitch of at least one trailer, which is hitchable to a tow vehicle, the tow vehicle having a steering system with which a steering angle is settable, the following steps are performed: a) detecting yaw oscillations of the tow vehicle over a certain period of time, e.g., 1 second to 3 seconds, at a constant or almost constant steering angle and above a predefinable speed of the tow vehicle without brake intervention, and b) evaluating the detected yaw oscillations for whether the amplitudes of the yaw oscillations do not fall below a predefinable amplitude threshold.

9 Claims, 1 Drawing Sheet

(56) References Cited

U.S. PATENT DOCUMENTS

| | | | |
|---|---|---|---|
| 7,302,332 B2* | 11/2007 | Nenninger | 701/72 |
| 7,561,953 B2* | 7/2009 | Yu | 701/78 |
| 8,010,252 B2* | 8/2011 | Getman et al. | 701/37 |
| 8,326,504 B2* | 12/2012 | Wu et al. | 701/69 |
| 2006/0204347 A1* | 9/2006 | Waldbauer et al. | 410/156 |
| 2009/0228182 A1* | 9/2009 | Waldbauer et al. | 701/70 |

FOREIGN PATENT DOCUMENTS

| | | |
|---|---|---|
| DE | 199 64 048 | 1/2001 |
| DE | 10034222 | 1/2002 |
| EP | 2 045 155 | 4/2009 |
| EP | 2045455 | 4/2009 |
| WO | WO 02/06101 | 1/2002 |
| WO | WO 2007/060135 | 5/2007 |

* cited by examiner

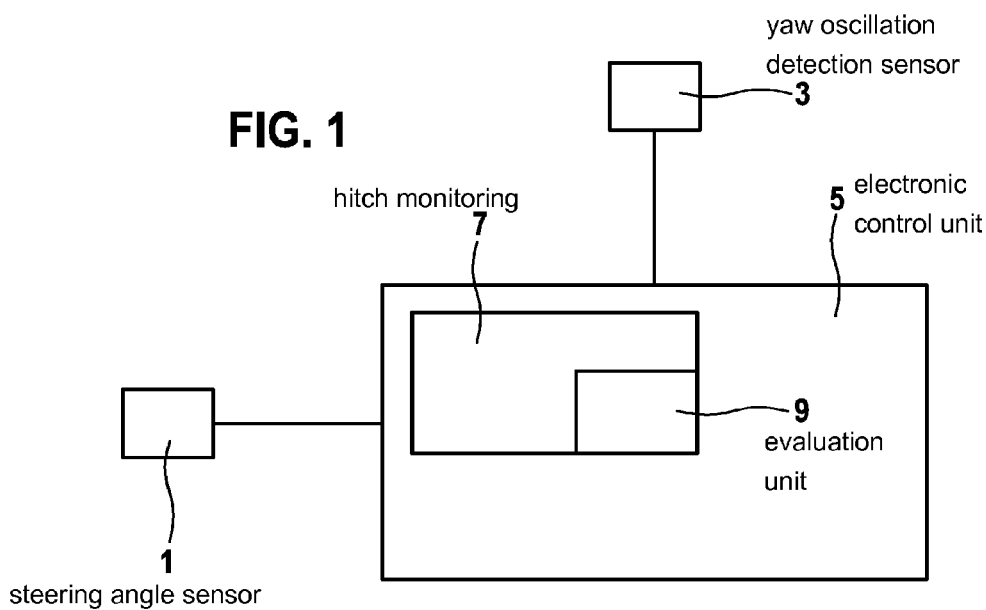
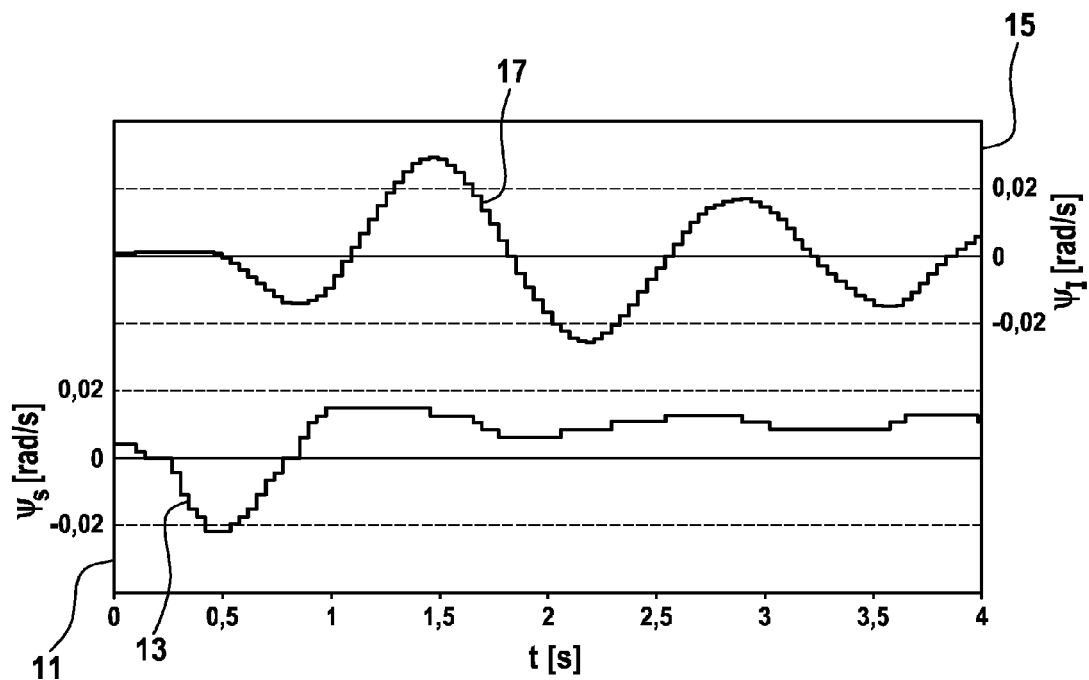

METHOD FOR MONITORING THE HITCH OF A TRAILER HITCHABLE TO A TOW VEHICLE AND CORRESPONDING ELECTRONIC DEVICE UNIT

CROSS-REFERENCE TO RELATED APPLICATIONS

This application is a continuation of U.S. patent application Ser. No. 13/520,553 filed on Jul. 3, 2012 which was filed as a PCT application PCT/EP2010/068695 on Dec. 2, 2010, which claims foreign priority benefits under 35 U.S.C. §119 to German Patent Application No. 10 2010 000 825.7, filed on Jan. 12, 2010, all of which are hereby incorporated by reference in their entirety.

FIELD OF THE INVENTION

The present invention relates to a device and a method for monitoring the hitch of at least one trailer which is hitchable to a tow vehicle, the tow vehicle having a steering with which a steering angle is settable.

BACKGROUND

Published German patent document DE 199 64 048 describes a method for stabilizing a road vehicle, in particular a passenger car, having a trailer which is towed by the road vehicle, the road vehicle being monitored with respect to rocking motions, and when rocking motions occur, a yaw moment is automatically applied, essentially being in phase opposition with the rocking motion. To detect this rocking motion, signals transmitted by a steering angle sensor, a yaw velocity sensor, a transverse acceleration sensor and a speed sensor are evaluated. If the rocking motion is detected when this method is performed, the individual wheels of the road vehicle are automatically and independently braked and/or accelerated briefly in such a way that a yaw moment is generated which is in phase opposition with the rocking motion.

However, brake or acceleration interventions may also occur during normal driving operation without there being any trailer-induced rocking motion if there is an oscillation similar to the trailer-induced rocking motion caused by various external influences (uneven terrain, gusts of side wind, etc.).

BRIEF SUMMARY OF THE INVENTION

To increase the accuracy of detection in the method described in published German patent document DE 199 64 048, a method is now provided with the present invention, in which the presence of a trailer hitched to a tow vehicle is ascertained. For this purpose, a method is provided for monitoring the hitch of at least one trailer hitchable to a tow vehicle, which method has the following steps: (a) detecting yaw oscillations of the tow vehicle over a certain period of time, in particular 1 second to 3 seconds at a constant or almost constant steering angle and above a predefinable speed of the tow vehicle without brake intervention and (b) evaluating the detected yaw oscillations for whether the amplitudes of the yaw oscillations do not fall below a predefinable amplitude threshold value. In the method according to the present invention for monitoring the hitch, the presence of the trailer at the tow vehicle is checked. This does not analyze whether the trailer is correctly hitched to the tow vehicle but instead only whether the hitch is present between the tow vehicle and the trailer. The constant or almost constant steering angle is understood to be a steering angle which may change slightly or within small limits, but preferably the predefinable amplitude threshold value is not exceeded. In one preferred specific embodiment, the yaw oscillations are detected for a certain period of time of 1.5 seconds to 3 seconds, preferably 2 seconds to 3 seconds, preferably approximately 2 seconds and in particular exactly 2 seconds. The method according to the present invention provides that no brake intervention takes place within this period of time. The term "brake intervention" includes a brake intervention by the driver and/or a brake application triggered by the electronic control system. In a preferred manner, there is also no acceleration of the tow vehicle caused by the driver and/or the electronic control system. The method is preferably performed at a constant or almost constant speed. Alternatively, the amplitudes of the yaw rates are detected and evaluated accordingly instead of the amplitudes of the yaw oscillations. The yaw rates and the yaw oscillations have identical amplitudes and may therefore be interchanged with one another. Only the phases of their amplitudes have a time offset. If there are maximums and minimums in the yaw oscillations then the yaw rates have zero crossings there and vice versa. Thus the amplitude threshold value is understood to refer to the threshold value not only of the yaw oscillations but also of the yaw rates. The yaw rates of the tow vehicle are preferably detected and the yaw oscillations are determined from them. The yaw oscillations are detected in particular at a constant or almost constant steering angle which is not equal to zero, in other words, when negotiating curves.

One refinement of the present invention provides that the steering angle is set to be equal to zero or approximately equal to zero. The method for monitoring the hitch is only started in this case when the tow vehicle is traveling straight ahead. The steering angles which occur then may change slightly or within small limits. The predefinable amplitude threshold value is preferably not exceeded here.

One refinement of the present invention provides that the method for monitoring the hitch is triggered with the aid of a predefinable steering angle change and/or steering angle change per unit of time, in particular of less than 0.02 rad/s. Alternatively or additionally, the method for monitoring the hitch may be triggered by side wind and/or by other external influences if it creates a yaw rate of less than 0.02 rad/s in particular. The evaluation of the yaw oscillations is not started in this way until there is a steering angle change and/or a steering angle change per unit of time caused by side wind and/or an electronic control system and yaw oscillations are thereby induced. Only at an induced steering angle change of less than 0.02 rad/s, preferably 0.01 rad/s to 0.02 rad/s, in particular from 0.015 rad/s to 0.02 rad/s, are the yaw oscillations detected and the detected yaw oscillations are evaluated for whether there is a trailer-induced yaw oscillation, so that it is possible to detect whether a trailer is hitched to a tow vehicle.

One refinement of the present invention provides that the speed of the tow vehicle is selected to be greater than 15 m/s. The probability that trailer-induced yaw oscillations or yaw rates occur increases with an increase in speed. Thus the trailer-induced yaw oscillations and yaw rates are attenuated up to a speed of 25 m/s. At higher speeds the amplitudes increase as seen over time ("escalating"). In one preferred specific embodiment, it is therefore provided that the yaw oscillations and/or yaw rates are to be detected and thus the evaluation of same is to be performed only above a speed of 15 m/s, in particular 20 m/s, in particular above 25 m/s.

One refinement of the present invention provides that the yaw oscillations are evaluated for whether their frequency is constant or almost constant. A trailer-induced yaw oscillation is characterized in that it has a frequency which changes only slightly over a period of time, in particular from 1 second to 3 seconds. The frequency of the yaw oscillations and/or the yaw rates may increase and/or decline slightly or in particular may remain constant. If the yaw oscillations and yaw rates are constant or almost constant, then the hitch check is positive and a trailer is hitched to the tow vehicle.

In one preferred specific embodiment, the yaw oscillations are detected and then evaluated for whether their frequency is in a range from 0.5 Hz to 2.0 Hz, preferably from 0.5 Hz to 1.5 Hz and particularly preferably from 1.0 Hz to 1.5 Hz. If such a frequency is detected, the method detects trailer-induced yaw oscillations and thus hitching of the trailer to the tow vehicle.

One refinement of the present invention provides that the yaw oscillations are evaluated for whether their amplitude is constant or almost constant. Trailer-induced yaw oscillations are characterized in that they have an amplitude which changes only slightly. If there is a constant or almost constant amplitude of the yaw oscillations, the method for monitoring the hitch detects that the trailer is hitched to the tow vehicle. In one preferred specific embodiment, the yaw oscillations are evaluated for whether their amplitude has a value of 0.01 rad/s to 0.06 rad/s, preferably 0.01 rad/s to 0.04 rad/s, preferably 0.01 rad/s to 0.03 rad/s and particularly preferably 0.01 rad/s to 0.02 rad/s.

In one preferred specific embodiment, the amplitudes of the yaw oscillations and the yaw rates are also evaluated in the certain period of time, in particular from 1 second to 3 seconds, which are reduced slightly because of a dampened transmission or are increased slightly due to the fishtailing of the tow vehicle/trailer rig.

In one preferred specific embodiment, yaw oscillations and yaw rates are evaluated for whether they have a zero crossing in addition to maximums and minimums. Only in the presence of a zero crossing of the yaw oscillations and yaw rates is it recognized, with the aid of the method for monitoring the hitch, that a trailer is hitched to the tow vehicle.

One refinement of the present invention provides that the amplitude threshold value is selected to be on the order of approximately 0.01 rad/s, in particular exactly 0.01 rad/s. The amplitude threshold value is selected in such a way that despite minor interference (uneven terrain, side wind, etc.) the method is able to detect trailer-induced yaw oscillations and/or yaw rates, so that misinterpretations of whether there is a hitch between the trailer and the tow vehicle are minimized.

The computer program according to the present invention provides that all the steps of the method according to the present invention are performed when it is run on a computer.

The computer program product according to the present invention having a program code stored on a machine-readable carrier executes the method according to the present invention while the program is run on a computer.

One refinement of the present invention provides for an electronic device unit for a tow vehicle, the tow vehicle having a steering with which a steering angle is settable and the device unit having at least one yaw oscillation detection sensor, a steering angle sensor and an electronic control unit connected to the sensors, this control unit having a device for monitoring the hitch of at least one trailer which is hitchable to the tow vehicle. It is provided that the device has an evaluation unit which analyzes the amplitudes of yaw oscillations of the tow vehicle for whether they fall below a predefinable amplitude threshold value over a certain period of time, in particular from 1 second to 3 seconds, at a constant or almost constant steering angle and above a predefinable speed without brake intervention. The electronic device unit is of course capable of measuring the speed of the tow vehicle and recording a brake application.

Using the electronic device unit, it is possible for an electronic control system of the tow vehicle to automatically monitor a hitch of at least one trailer, which is hitchable to the tow vehicle, to subsequently take stabilization measures on the part of the tow vehicle against trailer-induced yaw oscillations only when the presence of the trailer is confirmed.

In addition, it is preferably provided that the signals received from the yaw oscillation detection sensor and the steering angle sensor are initially processed. This signal processing may preferably include preamplification, offset correction and/or calibration.

BRIEF DESCRIPTION OF THE DRAWINGS

FIG. 1 shows an electronic device unit for a tow vehicle.

FIG. 2 shows a diagram in which setpoint vehicle yaw rate $\Psi_s$ (rad/s) and actual vehicle yaw rate $\Psi_1$ (rad/s) are plotted as a function of time t(s).

DETAILED DESCRIPTION OF THE INVENTION

FIG. 1 shows an electronic device unit for a tow vehicle in which a steering angle sensor 1, which is connected to the steering of a tow vehicle and detects the steering angle of the tow vehicle, and a yaw oscillation detection sensor 3 are connected via electrical lines to an electronic control unit 5. Electronic control unit 5 has a device for hitch monitoring 7, including an evaluation unit 9.

At a predefinable speed of the tow vehicle and without brake intervention, the steering angle of the tow vehicle is detected by steering angle sensor 1, and the yaw oscillations of the tow vehicle are detected by yaw oscillation detection sensor 3 and forwarded via the electrical lines to electronic control unit 5. In evaluation unit 9, the yaw oscillations are then evaluated for whether their amplitude does not fall below a certain threshold value in a certain period of time, in particular from 1 second to 3 seconds. If this is the case, the device for hitch monitoring 7 detects a hitched trailer and makes this information available to the control unit, for example.

FIG. 2 shows a diagram in which setpoint vehicle yaw rate $\Psi_s$ (axis 11 and curve 13) and actual vehicle yaw rate $\Psi_1$ (axis 15 and curve 17) are plotted as a function of time t. At t=0 s, a vehicle (not shown here) is in a condition in which the steering angle is kept constant or almost constant above a predefinable speed of the tow vehicle without brake intervention.

After the occurrence of a steering wheel-induced setpoint vehicle yaw rate $\Psi_s$ of approximately −0.02 rad/s at point in time t=0.5 s, setpoint vehicle yaw rate $\Psi_s$ drops again and is from point in time t=1 s almost constant at a value of approximately 0.01 rad/s. At this steering wheel-induced setpoint vehicle yaw rate $\Psi_s$ at point in time t=0.5 s (purely as an example), an actual vehicle yaw rate $\Psi_1$ (curve 13) which is not equal to zero may preferably occur which is detected and evaluated.

Actual vehicle yaw rate $\Psi_1$ is characterized in the diagram by an almost constant frequency of approximately 1.5 Hz and an almost constant amplitude of greater than 0.03 rad/s. In this case, a threshold value of 0.015 rad/s may be selected, for example.

Based on the present actual vehicle yaw rate $\Psi_1$ (curve 3), the presence of a trailer hitched to the tow vehicle may be inferred with the aid of the method according to the present invention. It is thus possible to avoid a control unit of the tow vehicle from initiating stabilization measures, which are necessary when trailer-induced yaw oscillation occurs.

What is claimed is:

1. A method for monitoring a hitch of at least one trailer hitched to a tow vehicle having a steering for setting a steering angle, comprising:

detecting, using at least one sensor, yaw oscillations of the tow vehicle over a predefined time period ranging from 1 to 3 seconds, at a substantially constant steering angle and above a predefined speed of the tow vehicle without brake intervention, and evaluating the detected yaw oscillations to determine whether the amplitudes of the detected yaw oscillations do not fall below a predefined amplitude threshold value.

2. The method as recited in claim 1, wherein the steering angle is set to be substantially equal to zero.

3. The method as recited in claim 1, wherein monitoring of the hitch is triggered with the aid of at least one of (i) a predefined steering angle change and (ii) a predefined steering angle change per unit of time which is less than 0.02 rad/s.

4. The method as recited in claim 2, wherein the predefined speed is above 15 m/s.

5. The method as recited in claim 4, wherein the detected yaw oscillations are evaluated to determine whether the frequency of the detected yaw oscillations is substantially constant.

6. The method as recited in claim 4, wherein the detected yaw oscillations are evaluated to determine whether the amplitude of the detected yaw oscillations is substantially constant.

7. The method as recited in claim 4, wherein the predefined amplitude threshold value has a magnitude of approximately 0.01 rad/s.

8. A non-transitory computer-readable data storage medium storing a computer program having program codes which, when executed on a computer, performs a method for monitoring a hitch of at least one trailer hitched to a tow vehicle having a steering for setting a steering angle, the method comprising:

detecting yaw oscillations of the tow vehicle over a predefined time period ranging from 1 to 3 seconds, at a substantially constant steering angle and above a predefined speed of the tow vehicle without brake intervention, and evaluating the detected yaw oscillations to determine whether the amplitudes of the detected yaw oscillations do not fall below a predefined amplitude threshold value.

9. An electronic device unit for a tow vehicle, the tow vehicle having a steering for setting a steering angle, at least one yaw oscillation detection sensor, and a steering angle sensor, the electronic device unit comprising:

an electronic control unit connected to the yaw oscillation detection sensor and the steering angle sensor, wherein the electronic control unit includes:

a monitoring device for hitch monitoring of at least one trailer hitched to the tow vehicle;

an evaluation unit configured to (i) analyze detected yaw oscillations of the tow vehicle over a predefined time period ranging from 1 to 3 seconds, at a substantially constant steering angle and above a predefined speed of the tow vehicle without brake intervention, and (ii) determine whether the amplitudes of the detected yaw oscillations do not fall below a predefined amplitude threshold value.

* * * * *